United States Patent [19]

Moorhead

[11] Patent Number: 4,735,866

[45] Date of Patent: Apr. 5, 1988

[54] COPPER-SILVER-TITANIUM-TIN FILLER METAL FOR DIRECT BRAZING OF STRUCTURAL CERAMICS

[75] Inventor: Arthur J. Moorhead, Knoxville, Tenn.

[73] Assignee: The United States of America as represented by the United States Department of Energy, Washington, D.C.

[21] Appl. No.: 889,702

[22] Filed: Jul. 28, 1986

Related U.S. Application Data

[63] Continuation-in-part of Ser. No. 814,942, Dec. 30, 1985, Pat. No. 4,698,271.

[51] Int. Cl.$^4$ .............................................. B32B 15/04
[52] U.S. Cl. .................................... 428/627; 228/172; 228/263.12; 420/502; 428/632
[58] Field of Search ................ 420/502; 428/469, 627, 428/632; 228/121, 122, 263.12

[56] References Cited

U.S. PATENT DOCUMENTS 2,917,140 12/1959 Omley .................................. 428/632

FOREIGN PATENT DOCUMENTS 244092 5/1969 U.S.S.R. ............................. 420/502

OTHER PUBLICATIONS

Miller et al., "Research on Ultrahigh-Temperature Materials—Monolithic Ceramics, Ceramic Matrix Composites, and Carbon/C", NASA.

Boyd et al., "Advanced Gas Turbine Ceramic Component Development", SAE, Apr. 1983, pp. 189–197.

*Primary Examiner*—L. Dewayne Rutledge
*Assistant Examiner*—Robert L. McDowell
*Attorney, Agent, or Firm*—Katherine P. Lovingood; Stephen D. Hamel; Judson R. Hightower

[57] ABSTRACT

A method of joining ceramics and metals to themselves and to one another at about 800° C. is described using a brazing filler metal consisting essentially of 35 to 50 at. % copper, 40 to 50 at. % silver, 1 to 15 at. % titanium, and 2 to 8 at. % tin. This method produces strong joints that can withstand high service temperatures and oxidizing environments.

3 Claims, No Drawings

COPPER-SILVER-TITANIUM-TIN FILLER METAL FOR DIRECT BRAZING OF STRUCTURAL CERAMICS

The invention relates to the development of copper-silver-titanium-tin brazing filler metals (or braze alloys) for direct brazing of ceramics to ceramics or ceramics to metals to form strong joints that can withstand high service temperatures. It was developed under a contract with the U.S. Department of Energy.

BACKGROUND OF THE INVENTION

This application is a continuation-in-part of previously filed copending patent application Ser. No. 814,942, filed Dec. 30, 1985, now U.S. Pat. No. 4,698,271.

A key technology that will enhance or restrict the use of ceramic materials in high-performance applications, such as advanced heat engines or high-temperature heat exchangers, is the ability to reliably join simple-shape ceramic components to form complex assemblies or to join unit lengths of ceramic material to form large ceramic systems. Although ceramic joining technology has been highly developed over the past fifty years, very little has been done to develop brazing filler metals for joining ceramics for use at elevated temperatures, at high stress levels and in dirty environments.

There are basically two brazing processes that can be used for joining ceramics. One is indirect brazing in which the ceramic is coated with a metal such as molybdenum or titanium prior to brazing with a nonreactive commercial filler metal. In the widely used moly-manganese process a glassy phase forms a bond with the ceramic and the molybdenum particles constitute the coating. In other indirect processes, the active metal titanium is applied to the ceramic by vapor deposition or from a slurry containing titanium hydride. The other major ceramic brazing process is direct brazing with filler metals specially formulated to wet and bond to the ceramics. Direct brazing is preferred since it avoids the development and application of what is, in many cases, the very sophisticated and expensive coating or metallizing treatment required for indirect brazing. Also, the inclusion of an active metal such as titanium within the filler metal more effectively protects the active metal from oxidation during storage or while brazing than when the pure active metal is first used to coat the ceramic. Finally, the strength of the bond between a coating and ceramic substrate, and the corrosion resistance of the coating do not have to be of concern in direct brazing.

In spite of the potential advantages of the direct brazing process, there are very few filler metals commercially available that will wet and adhere to structural ceramics. It is difficult to formulate such an alloy since ceramics, and particularly oxidebase ceramics, are notoriously difficult to wet. One filler metal that has been developed to braze ceramics is made by the WESGO Division of GTE Products Corporation and sold under the trade name "TICUSIL." This alloy contains 55 at. % silver, 37 at. % copper, and 8 at. % titanium. However, the strengths of ceramic-ceramic brazements made with this filler metal tend to be low, and quite variable even within a given brazed sample. Another filler metal previously developed by the inventor and disclosed in the parent to this C-I-P application is generally higher in copper and titanium and lower in silver than TICUSIL and exhibits better brazing characteristics. Outstanding strength values were achieved at a brazing temperature of 1000° C. for the filler metal having the composition Cu-26 Ag-29Ti. Although strength values were good, 1000° C. is too high for brazing certain metals that can experience transformations at that temperature. Therefore, in order to meet the requirements for joining various ceramics and metals for high performance applications, there is a need to develop filler metals that can wet and strongly adhere to ceramics and metals at temperatures around 800° C. and also withstand high service temperatures and oxidizing conditions.

SUMMARY OF THE INVENTION

In view of the above-mentioned need, it is an object of this invention to provide brazing filler metals for direct brazing of ceramics and metals to themselves and to on another at temperatures around 800° C. to form strong joints for use in high-performance applications at elevated temperatures, high-stress levels and in oxidizing environments. Other objects and advantages of the invention will be apparent to those skilled in the art from the detailed description and the claims.

The invention is generally described as a filler metal having a low brazing temperature for joining metals and ceramics to themselves and one another that contains an active metal that will wet and bond to ceramics and metals and enough tin to lower the melting point without embrittling the filler metal. The invention is also a method of joining ceramics and metals to themselves and to one another by brazing at not greater than 850° C. in a nonoxidizing atmosphere with a filler metal in the composition range of 35 to 50 at. % copper, 40 to 50 at. % silver, 1 to 15 at. % titanium, and 2 to 8 at. % tin. The invention is also a composite structure having at least two structural components of ceramics and metals joined to themselves or to one another with a brazing filler metal in the composition range of 35 to 50 at. % copper, 40 to 50 at. % silver, 1 to 15 at. % titanium, and 2 to 8 at. % tin. In addition, the invention is a brazing filler metal consisting essentially of 35 to 50 at. % copper, 40 to 50 at. % silver, 1 to 15 at. % titanium, and 2 to 8 at. % tin. These filler metals have the advantages of wetting and strongly adhering to ceramics and the capacity to withstand high service temperatures. They also have sufficiently low brazing temperatures (<850° C.) to permit direct brazing of thermally sensitive structural materials such as nodular cast iron (NCI) and partially stabilized zirconia (PSZ) without damage to either the iron or the ceramic.

DETAILED DESCRIPTION OF THE PREFERRED EMBODIMENT

Much work has been done in recent years to develop methods of joining ceramics to ceramics or ceramics to metals for use in high-temperature applications. A preferred technique is direct brazing wherein two components to be joined are brazed together using a filler metal that can wet and adhere to the respective surfaces of the components. One line of development for joining oxide-base ceramics is the use of filler metals containing oxide-forming active elements such as titanium. Oxide-base ceramics to which the brazing filler metals of this invention will adhere include partially stabilized zirconias, high-purity high-density aluminas, and alumina-matrix and mullite-matrix composites.

The filler metals studied were made either by melt-spinning onto a rapidly rotating stainless steel wheel, or by conventional casting and rolling. Although brazing was done in vacuum ranging from $2 \times 10^{-4}$ mm Hg or lower, this would not preclude brazing in a high-purity, inert gas environment. Filler metals prepared and tested are described in Table 1. In comparison with the filler metals of the parent application, the subject filler metals are lower in titanium content and also contain small but significant amounts of tin. Even more significant is the fact that these tin-containing filler metals produce stronger joints than those made using the Cu-Ag-Ti alloys in the parent application.

Applicant investigated a number of metals that have lower surface tensions than silver or copper in hopes of achieving improved wetting characteristics. Among the metals tested, tin has proven to be successful at enhancing the wetting characteristics of the braze alloy; however, there is an unexpected added advantage in using tin because it appears to activate the titanium so less titanium is needed to form strong joints when compared with the filler metals of the parent application. Adding tin, a metal having a low melting point, and lowering the percentage of titanium, a metal having a high melting point, assist in lowering the melting point of the brazing filler metals to permit brazing at around 800° C. The amount of tin added is critical because it tends to reduce the ductility of the brazing alloy which creates problems in fabrication. For ductility suitable for cold rolling the filler metal to a foil, the amount of tin must be kept at about 4% or less. If a particularly strong joint is desired, the amount of tin can be increased to 8% without affecting the brittleness of the braze joint; but the fabrication characteristics of the alloy will be impaired.

TABLE I

Experimental Brazing Alloy Compositions

| Filler Metal Designation | Composition of Drop Casting (at. %) |
|---|---|
| 94 | Ag—45Cu—7Sn—1Ti |
| 95 | Ag—44Cu—7Sn—2Ti |
| 96 | Ag—41Cu—7Sn—3Ti |
| 97 | Ag—40Cu—7Sn—7Ti |
| 98 | Ag—37Cu—6Sn—15Ti |
| 99 | Ag—48Cu—4Sn—1Ti |
| 100 | Ag—48Cu—4Sn—4Ti |

Example I

The wetting and bonding behavior of braze filler metals, selected from Table I, was demonstrated using ceramic substrates specifically described as Degussit AL-23 alumina (product of Degussa, Federal Republic of Germany, greater than 99.5% $Al_2O_3$) and an experimental SiC whisker toughened alumina composite (SCW-58) under development at ORNL. Sessile drop specimens were prepared by placing a small amount of filler metal (~10 mg) on a small ceramic coupon and brazing in a tube furnace under vacuum of $\sim 1 \times 10^{-5}$ mm Hg. The brazing conditions and results are shown in Table II and Table III. Note that excellent bond strengths were achieved.

TABLE II

Wetting and Bonding Behavior of Sessile Drops of Experimental Brazing Filler Metals on ORNL's SiC Whisker Toughened Alumina Composite

| Specimen | Filler Metal Designation | Brazing Temp. (°C.) | Wetting Angle[a] | Shear (MPa) | Strength[b] (ksi) | Locus of Failure |
|---|---|---|---|---|---|---|
| 507.8 | 94 | 800[c] | 70 | 54 | 7.8 | Ceramic |
| 507.9 | 94 | | 60/70 | 65 | 9.4 | Ceramic |
| 508.2 | 95 | 800[c] | 60/65 | 159 | 23.0 | Thru drop[d] |
| 508.4 | 99 | | 50 | 142 | 20.6 | Thru drop |
| 508.5 | 99 | | 40 | 25 | 3.6 | Interface |
| 508.6 | 96 | | 55 | 150 | 21.7 | Thru drop |
| 508.7 | 100 | | 20 | e | | |
| 509.7 | 94 | 850[c] | 80 | 103 | 14.9 | Interface |
| 509.8 | 95 | | 45 | 104 | 15.1 | Thru drop |
| 509.9 | 96 | | 55/60 | 95 | 13.8 | Thru drop |
| 510.2 | 97 | 850[c] | 25 | 69 | 10.0 | Thru drop |
| 510.4 | 99 | | 35/40 | 110 | 16.0 | Thru drop |
| 510.5 | 99 | | 35 | 116 | 16.8 | Thru drop |
| 510.6 | 100 | | 10 | e | | |
| 510.7 | 100 | | 10 | e | | |

[a]Measured at room temperature with "shadowgraph."
[b]Push-off test at room temperature.
[c]Held 5 min. at temperature in vacuum of $< 1 \times 10^{-5}$ mm Hg.
[d]Indicates the top of drop was sheared away without failure of bond with ceramic.
[e]Wetting angle too low for shear drop test.

TABLE III

Comparison of Wetting and Bonding Behavior of Sessile Drops of Experimental Brazing Filler Metals on Commercial Alumina and SiC Whisker Toughened Alumina Composite

| | | Brazed at 800° C. | | | | Brazed at 850° C. | | | |
|---|---|---|---|---|---|---|---|---|---|
| | | AL-23 Alumina | | SCW-58-1 | | AL-23 Alumina | | SCW-58-1 | |
| Filler Metal | Composition (at. %) | Wetting Angle[a] | Shear[b] (MPa) | Wetting Angle | Shear (MPa) | Wetting Angle | Shear (MPa) | Wetting Angle | Shear (MPa) |
| 94 | Ag—45Cu—7Sn—1Ti | 65 | 162 | 70 | 60 | 70 | 109 | 80 | 103 |
| 95 | Ag—44Cu—7Sn—2Ti | 50 | 140 | 65 | 159 | 50 | 146 | 45 | 104 |
| 96 | Ag—41Cu—7Sn—3Ti | 50 | 146 | 55 | 150 | 45 | 122 | 60 | 95 |
| 97 | Ag—40Cu—7Sn—7Ti | 50 | 124 | — | — | 30 | 119 | 30 | — |
| 99 | Ag—48Cu—4Sn—1Ti | 45 | 130 | 50 | 142 | — | — | 35 | 113 |
| 100 | Ag—48Cu—4Sn—4Ti | 20 | >68[c] | 20 | — | — | — | 10 | — |

[a]Determined with shadowgraph at room temperature.
[b]Load at failure divided by interfacial area between drop and substate.
[c]Wetting angle was so low that only top of drop was sheared off.

Example II

In another series of tests, room and elevated temperature flexural strength tests were conducted on ceramic specimens using alloys selected from Table I. Ceramic coupons specifically described as Coors AD-998 alumina (product of Coors Porcelain Company, Golden, Colo., 99.8% Al$_2$O$_3$) and MgO partially stabilized zirconia (product of Nilcra Ceramics Ltd., Victoria, Australia) of dimensions 3×16×25 mm were joined in a butt configuration. Brazing was done in a tube furnace under vacuum of a ~1×10$^{-5}$ mm Hg. The coupons were held in a SiC fixture with Mo foil springs to provide slight end loading. Although the specific PSZ brazed was the one designated by Nilcra as their "MS" grade, similar results would be expected for Coors Porcelain's TTZ material (a partially stabilized zirconia with 3% MgO), or NGK's Z191 ceramic, a tetragonal zirconia polycrystal ceramic with about 5% Y$_2$O$_3$ that is made in Japan. After brazing, the major surfaces of the coupons were ground with a 220 grit diamond wheel to remove surface imperfections and excess filler metal. The finally prepared specimens were tested in 4-point bending with the braze joint across the span. Results of these tests are summarized in Table IV.

TABLE IV

Flexural Strength of Alumina, Zirconia, and Silicon Carbide Whisker Toughened Alumina (SCW-76) Joined with Experimental Brazing Filler Metals

| Braze Coupon No. | Filler Metal | Temperature (°C.) Brazing[a] | Test[b] | Number of Samples | Mean Strength[c] (MPa) |
|---|---|---|---|---|---|
| DEGUSSIT AL-23 ALUMINA | | | | | |
| 498 | 95 | 800 | 25 | 3 | 177 |
| 499 | 95 | 850 | 25 | 4 | 186 |
| 515 | 99 | 800 | 400 | 4 | 152 |
| COORS AD-998 ALUMINA | | | | | |
| 511 | 95 | 850 | 400 | 2 | 88 |
| 517 | 99 | 800 | 400 | 4 | 272 |
| 531 | 99 | 800 | 600 | 2 | 242 |
| NILCRA PSZ (83-064MS) | | | | | |
| 500 | 95 | 850 | 25 | 4 | 415 |
| 516 | 99 | 800 | 400 | 4 | 426 |
| SCW-76 | | | | | |
| 528.1 | 99 | 800 | 25 | 1 | 563 |
| 528.2 | 99 | 800 | 400 | 3 | 466 |
| 528.5 | 99 | 800 | 600 | 3 | 194 |
| 529.1 | 100 | 800 | 25 | 2 | 472 |
| 529.6 | 100 | 800 | 600 | 3 | 311 |

[a] All brazing in vacuum of 9 × 10$^{-6}$ mm Hg or better.
[b] Samples held for 30 min. at temperature prior to testing.
[c] Loading rate 22 kg/s.

The best brazing compositions in this series appear to be alloys 99 and 100. Both are sufficiently ductile, as cast, to permit fabrication into foil by cold rolling. The 99 alloy is a little more ductile, but as shown in Table IV, joints prepared with the 100 alloy are stronger at 600° C.

This invention provides improved alloys which have low brazing temperatures (~800° C.), wet oxide ceramics, form very strong joints on a wide range of ceramics, and exhibit good strength characteristics at temperatures up to 75% of the brazing temperature. The addition of tin has the effect of lowering the surface tension of the braze alloy as well as activating the titanium so less is needed to form a strong joint. The overall result is a good braze alloy with a relatively low brazing temperature.

I claim:

1. A brazing filler alloy having a low brazing temperature for directly joining ceramics to metals comprising 35 to 50 at. % copper, 40 to 50 at. % silver, 1 to 15 at. % titanium and 2 to 8 at. % tin.

2. A method of joining ceramic and metal components comprising assembling surfaces of components to be joined in an abutting relationship with a brazing filler metal disposed thereinbetween, said brazing filler metal consisting essentially of 35 to 50 at. % copper, 40 to 50 at. % silver, 1 to 15 at. % titanium, and 2 to 8 at. % tin heating the resulting assembly to a brazing temperature in the range of 800° to 850° C. under nonoxidizing conditions and cooling the resulting braze joint.

3. A composite body comprising at least two structural components of ceramics and metals joined with brazing filler metal disposed thereinbetween consisting essentially of 35 to 50 at. % copper, 40 to 50 at. % silver, 1 to 15 at. % titanium, and 2 to 8 at. % tin.

* * * * *